May 2, 1961 A. M. FESTER 2,982,233
DOUGHNUT MACHINE
Filed Jan. 26, 1959 2 Sheets-Sheet 1
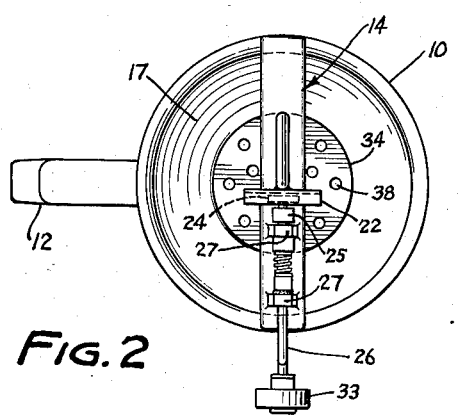
FIG. 1
FIG. 2
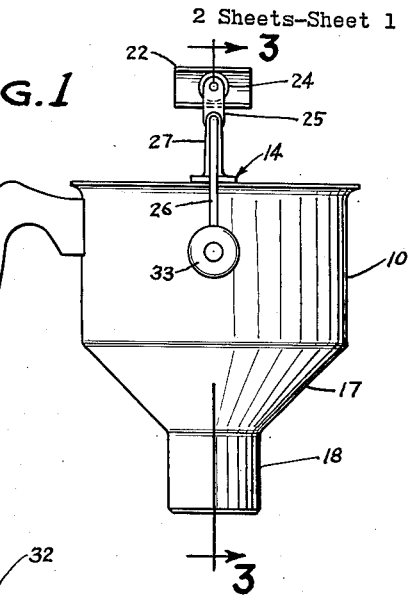
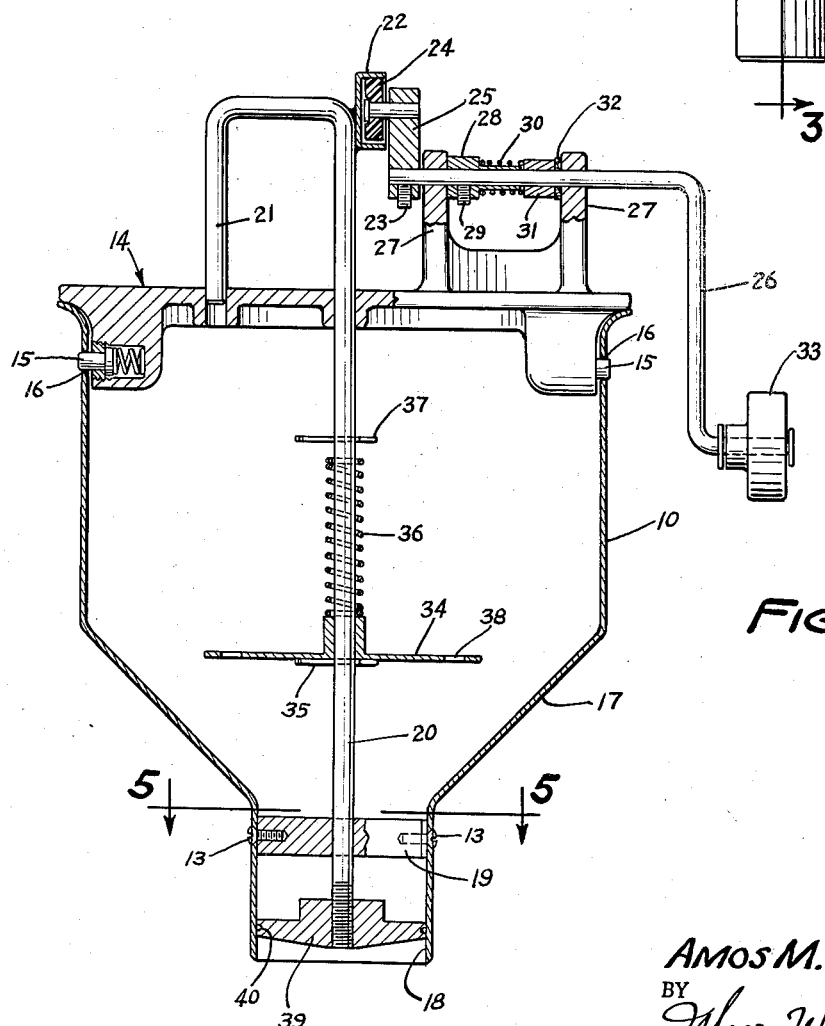
FIG. 3
INVENTOR.
AMOS M. FESTER
BY
Moore, White & Burd
ATTORNEYS May 2, 1961  A. M. FESTER  2,982,233
DOUGHNUT MACHINE
Filed Jan. 26, 1959  2 Sheets-Sheet 2
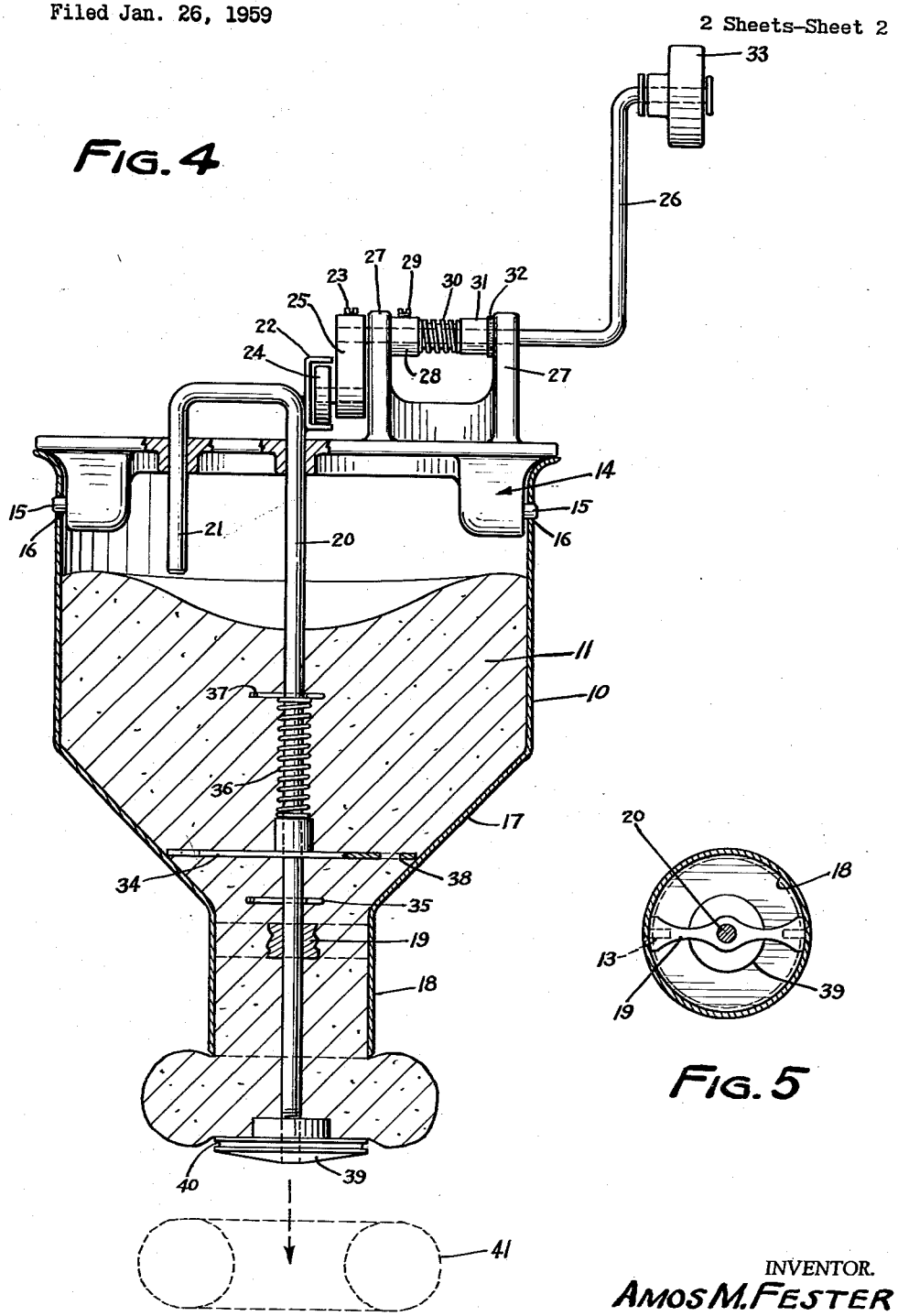
INVENTOR.
AMOS M. FESTER
BY Moore, White & Burd
ATTORNEYS

United States Patent Office 2,982,233
Patented May 2, 1961

2,982,233

DOUGHNUT MACHINE

Amos M. Fester, 7344 Sheridan Ave. S., Minneapolis, Minn.

Filed Jan. 26, 1959, Ser. No. 788,815

9 Claims. (Cl. 107—14)

This invention relates to a new doughnut extruding machine characterized by a simplified structure resulting from the dough-advancing element being mounted on the same shaft that operates the doughnut cutter. The machine is also characterized by perforations in the dough-advancing element for the best operation of this simplified extruder. Another improved feature of this invention is an adjustable cutter that also has an annular oiling groove in its peripheral edge. Other features of this invention include spring loaded securing bosses and removable cutter which make it possible to disassemble the unit easily for cleaning.

Previously existing doughnut extruding machines have usually employed a dough advancing means that is coextensive with a cross-section of the hopper and driven by a mechanism separate from that which drives the cutter. The speed at which such a dough advancing means is actuated is usually slower than the action of the cutter, and also is usually unidirectional rather than reciprocating; hence, ratchet drives, gearing, or other speed retarding linking mechanism has been employed. Furthermore, the cutters of these earlier devices were fixed on their driving shafts which caused them to be always moved the same amount regardless of the dough used or the size of doughnuts desired. Still another drawback to these known machines was their lack of means to keep the dough from sticking to their cutters resulting in inconsistent and unsatisfactory operation.

Accordingly, it is the principal object of this invention to provide a novel doughnut extruder; one that:

(1) Is greatly simplified in structure.
(2) Is easy to operate.
(3) Is consistent in its operation of producing doughnuts.
(4) Can be adjusted to make doughnuts of different sizes easily and without disassembling the device.
(5) Is readily maintained in a sanitary operating condition.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

Figure 1 is a side elevation of this new doughnut machine.

Figure 2 is a plan view of the doughnut machine.

Figure 3 is an enlarged vertical section of the doughnut machine, taken on the line 3—3 of Figure 1.

Figure 4 is a view similar to that of Figure 3, and drawn to the same scale as that figure, but showing the structure in an adjusted position illustrating one of the steps in process of extruding a doughnut. Broken lines illustrate how the doughnut drops away from the extruder, as it is cut.

Figure 5 is a horizontal section taken on line 5—5 of Figure 3, and drawn to the same scale as that figure.

In the drawings, the hopper 10 may be seen to serve both as a repository for dough 11 that is to be extruded and as a frame for the rest of the mechanism of the device. A handle 12 serves as a means for conveniently supporting the extruder manually over the frying fat. Secured within the top of the hopper is an auxiliary frame member 14 which is fastened in the hopper against accidental displacement by the spring-loaded bosses 15 that extend through openings 16 in the hopper top. The structure of the spring-loaded bosses is best observed in Figure 3, wherein a portion of auxiliary frame 14 is broken away in order to illustrate the internal structure of the spring bosses. Hopper 10 has a diminishing conical or funnel portion 17 formed at its lower end, which terminates in a substantially-reduced cylindrical tube having an extruding opening 18.

Slidably mounted within the hopper, and sliding in both the auxiliary frame 14 as well as a lower bearing support 19, is a central vertical shaft 20 adapted to be reciprocated. Lower bearing support 19 is in the form of a spider secured in the extruder tube that terminates in opening 18 by suitable means such as screws 13. Shaft 20 is stabilized against rotation by a guide 21 that is desirably a portion of shaft 20 bent back upon itself. It also reciprocates in an opening through the auxiliary frame 14. Shaft 20 may be reciprocated by a simple crank assembly. Rigidly secured to shaft 20 is a channel member 22. Within this channel member there is a roller 24 of any suitable material, such as nylon or the like. The roller is driven in a circular path by being secured to arm 25 that, in turn, is fixed to the crank 26. A set screw 23 keys arm 25 to the shaft of crank 26.

The crank 26 is journaled in a pair of suitable bosses that may desirably be formed integrally with the auxiliary frame member 14. A collar 28 having a set screw 29 in it is clamped onto the portion of the crank shaft that extends between bosses 27. Spring 30 together with collar 31 provides a yielding force applied to collar 28 tending to move crank 26 to the left as viewed in Figures 3 and 4. Since collar 28 is fixed to crank 26, friction between the collars, fiber washer 32, and bosses 27 tends to assure sufficient resistance to the turning of crank 26 to prevent the weight of dough in the hopper above advancing plate 34 from forcing the plate 34, shaft 20, and cutter 39 downwardly except when under control of the operator through the crank. It also assures that roller 24 is properly positioned in channel 22. A washer 32 is disposed on the crank shaft between collar 31 and the right-hand one of the bosses 27, as viewed in Figures 3 and 4. To minimize wear, washer 32 is preferably of non-metallic material. A suitable hand grip 33 is freely rotatable about the outer end of crank 26 to facilitate rotating the crank manually.

As may be clearly seen from Figures 3 and 4, a dough advancing plate 34 is slidably mounted on shaft 20. This dough advancing element is restricted in its movement downward relative to the shaft by any suitable stop, such as a cotter pin 35 extending through the shaft below the dough advancing plate. In a similar manner, upward movement of the plate is also limited except that the upward movement is yieldingly resisted by a suitable resilient means such as spring 36. This spring engages the dough advancing plate and also is secured against movement on shaft 20 in a vertical direction by a suitable stop such as a cotter pin 37 extending through shaft 20. Also, it should be noted that the dough advancing plate has perforations 38 in it, and these were found necessary for best operation in order for the plate to release quickly from the dough 11 as shaft 20 begins an upward stroke to cut off a doughnut already extruded and also to withdraw plate 34 from the dough in the lower or funnel portion 17 of the hopper.

At the lower end of shaft 20 is the circular cutting device 39 which reciprocates relative to the beveled cutting edge of extrusion opening 18. Cutting element 39 is provided with an annular groove 40 which serves to retain lubricating oil, such as the cooking grease used in frying the doughnuts applied by immersing the cutter into the fat and thereby prevents the cutting element from getting too sticky at its edge portions to release easily a doughnut that has been cut. Cutting element 39 is adjustably secured to shaft 20 in any suitable manner, and it is here shown as threaded thereon to permit control over the size of the doughnuts. This threading of the cutter 39 onto shaft 20 also permits the cutter element to be released altogether from the device so that it may be disassembled for easy and thorough cleaning. For example, with the cutter element 39 removed, the spring-loaded bosses 15 may be forced inwardly until they clear the inside of the hopper. After the bosses are freed from openings 16, the auxiliary frame and all of the operating structure secured to it may be lifted out of the hopper. This obviously makes it very easy to wash the device, and maintain it in a sanitarily clean condition. Because the cutting element 39 is threaded onto the shaft 20, substantial variations in the thickness and over-all size of the doughnuts extruded by this machine may be had. When the cutter 39 is screwed on to shaft 20 to the limit the threads allow, a relatively small amount of dough will be released as compared to the amount extruded when the cutter is unscrewed until it barely cuts the dough at extruding opening 18 on an upward stroke of reciprocated shaft 20. It is possible, obviously, to change the adjustment of the cutter 39 quite rapidly in the course of extruding a batch of doughnuts. A few seconds' time permits the operator to either unscrew the cutting element in order to provide more clearance for dough being extruded, or to screw it farther onto the shaft in order to reduce this clearance during an interval between actually extruding doughnuts into the cooking fat.

Operation

The operation of the device is perhaps best observed by looking at Figures 2, 3, and 4 in that order. As may be seen easily in Figure 2, dough may be inserted into the hopper on either side of the auxiliary frame 14. When the device is full of dough, the operator, by supporting the hopper 10 with the handle 12 over the cooking fat, is ready to begin extruding doughnuts. Using his other hand, the operator rotates the crank 26 which causes both the cutting element and the dough-advancing plate to move downward as shown in Figure 4. With the dough being forced downward by plate 34 through the opening provided at the extruder end by the lowering of the cutting element, the dough 11 squeezes out between the lower end of the hopper and the cutter element, as clearly shown in Fig. 4. Continued rotation of the crank returns the cutting element to the position shown in Figure 3, and in so doing cuts off and separates from the main body of the dough the doughnut 41, shown in broken lines, in Figure 4. This doughnut drops freely by gravity into the cooking fat, and proceeds to be cooked after the manner well-known in the art. As the shaft 20 is moved to the position shown in Figure 3, the dough advancing plate is raised by being engaged by the lower stop 35.

Simultaneously with the cutting of the doughnut as just described, shaft 20 causes an upward force to be exerted on the doughnut-advancing plate 34. As can be seen in Figure 4, this plate has engaged the funnel portion of the hopper as it is forced down by spring 36, and has severed the dough 11 that is above the plate from the dough below the plate. As shaft 20 continues reciprocating, the lower stop, cotter pin 35, engages the under-side of the plate, and forces it upward. By reason of the plate being forced upward, an evacuated area under pressure lower than atmospheric is created between the dough above the plate and that below the plate. Dough moves to fill this evacuated space, and since the dough in the upper part or enlarged portion of the hopper 10 has a much larger surface presented to atmospheric pressure than that below, it has many times greater pressure exerted on it. Dough will tend to flow more rapidly into the evacuated space from above the plate than from the lower portion of the hopper. Also, of course, the cutter element has been retracted almost to the point of cutting off the doughnut before the plate is raised and, hence, most of the atmospheric pressure that would otherwise be exerted on the dough in the extruding opening is cut off by element 39. With the dough-advancing plate and cutter in the raised position shown in Figure 3, and dough having flowed down and around the cutter advancing element, a continued rotation of the crank 26 will produce a downward motion of the shaft which again permits the cutter element to move out of the extruding opening while the plate follows driven by spring 36. The dough-advancing plate will continue to force dough out through the extrusion opening 18 as the crank handle is turned. Finally, the position at the extreme lower end of the crank throw shown in Figure 4 is reached, and the cycle has been completed.

It is apparent that many modifications and variations of this invention as hereinbefore set forth may be made without departing from the spirit and scope thereof. The specific embodiments described are given by way of example only, and the invention is limited only by the terms of the appended claims.

I claim:

1. An improved doughnut machine including a hopper with a funnel portion terminating in an extrusion opening, a cutter element, a reciprocating shaft secured to and driving said cutter element for alternately opening and closing the extrusion opening of the hopper funnel portion, a plate smaller than the inside of the hopper and larger than the extrusion opening of said funnel portion and slidably mounted on the reciprocating shaft, a stop secured to the reciprocating shaft below said plate, a resilient element secured to the reciprocating shaft and yieldingly limiting upward movement of said plate relative to the reciprocating shaft, and rotary means for imparting reciprocatory motion to said reciprocating shaft.

2. The doughnut extruder according to claim 1 in which said plate is perforated.

3. The doughnut extruder according to claim 2 in which said cutter element is vertically adjustable on said reciprocating shaft.

4. The doughnut extruder according to claim 3 in which said cutter element has an annular groove.

5. The doughnut extruder according to claim 1 further characterized in that said extrusion opening and cutter element are circular.

6. The doughnut extruder according to claim 1 further characterized in that said reciprocating shaft is provided with guide means to prevent rotation of the shaft.

7. The doughnut extruder according to claim 1 further characterized in that said reciprocating shaft at the end opposite said cutter element is provided with a horizontal channel; said rotary means including a roller movable in said channel and a crank, said roller being rotatably mounted on an arm of said crank to drive said reciprocating shaft.

8. The doughnut extruder according to claim 7 further characterized in that an auxiliary frame is removably secured to the top of said hopper, said crank is journaled in a pair of upstanding bosses formed on said frame and resilient means are provided on said crank between said bosses to urge said crank in one direction to urge said roller into engagement with said horizontal channel.

9. In a doughnut extruder; a hopper having openings in the side walls thereof and a funnel portion providing an extrusion opening; an auxiliary frame resting on the top of said hopper and extending into said hopper as far as the openings in the side walls thereof; spring loaded bosses secured to said auxiliary frame and engaging the openings in the side walls of said hopper to releasably secure said auxiliary frame in said hopper; upstanding bosses formed on said auxiliary frame; a crank journaled in said upstanding bosses; an arm secured to said crank; a roller rotatably secured to said arm; a resilient means on said crank between said bosses yieldingly urging said crank in one direction in relation to said upstanding bosses; a lower bearing support fixed in said hopper; a shaft slidably secured in said auxiliary frame and said lower bearing support; said shaft having its upper end bent back upon itself and slidably engaging said auxiliary frame also to stabilize said shaft against turning; a channel member secured to said shaft and embracing said roller; a pair of vertically spaced stops on said shaft; a perforated plate slidably embracing said shaft between said stops; a coil spring embracing said shaft above said plate and below the upper one of said stops; and a cutter disc threadably engaging the end of said shaft; said cutter disc having an annular groove in its periphery.

References Cited in the file of this patent

UNITED STATES PATENTS

| | | |
|---|---|---|
| 2,610,590 | Van Campen | Sept. 16, 1952 |
| 2,828,700 | Belshaw | Apr. 1, 1958 |
| 2,881,716 | Belshaw | Apr. 14, 1959 |